(12) United States Patent
David

(10) Patent No.: US 7,617,492 B2
(45) Date of Patent: Nov. 10, 2009

(54) EXTENSIBLE COMMAND LINE PARSING

(75) Inventor: Matthew E. David, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 677 days.

(21) Appl. No.: 10/878,553

(22) Filed: Jun. 28, 2004

(65) Prior Publication Data

US 2005/0289525 A1 Dec. 29, 2005

(51) Int. Cl.
*G06F 9/45* (2006.01)
*G10L 15/28* (2006.01)
(52) U.S. Cl. .................................. 717/143; 704/252
(58) Field of Classification Search .................. 717/143
See application file for complete search history.

(56) References Cited

U.S. PATENT DOCUMENTS

| | | | | | |
|---|---|---|---|---|---|
| 4,595,980 | A | * | 6/1986 | Innes | 704/8 |
| 5,687,378 | A | * | 11/1997 | Mulchandani et al. | 717/131 |
| 6,286,035 | B1 | * | 9/2001 | Gillis et al. | 709/206 |
| 6,397,263 | B1 | * | 5/2002 | Hancock et al. | 719/322 |
| 6,397,383 | B1 | * | 5/2002 | Chang et al. | 717/142 |
| 6,738,781 | B1 | * | 5/2004 | Mustoe et al. | 707/102 |
| 6,850,950 | B1 | * | 2/2005 | Clarke et al. | 707/102 |
| 6,980,996 | B1 | * | 12/2005 | Mustoe et al. | 707/102 |
| 7,039,637 | B2 | * | 5/2006 | Murray et al. | 707/6 |
| 7,254,751 | B2 | * | 8/2007 | Snover et al. | 714/48 |
| 7,263,691 | B2 | * | 8/2007 | Vehkomaki | 717/140 |
| 2002/0046398 | A1 | * | 4/2002 | Osborne et al. | 717/126 |
| 2003/0048287 | A1 | * | 3/2003 | Little et al. | 345/705 |
| 2003/0196195 | A1 | * | 10/2003 | Sluiman | 717/143 |
| 2004/0010781 | A1 | * | 1/2004 | Maly et al. | 717/143 |
| 2004/0216138 | A1 | * | 10/2004 | Pankovcin et al. | 719/320 |
| 2004/0264696 | A1 | * | 12/2004 | Cockburn et al. | 380/200 |
| 2005/0060693 | A1 | * | 3/2005 | Robison et al. | 717/143 |
| 2005/0132043 | A1 | * | 6/2005 | Wang et al. | 709/224 |
| 2005/0172339 | A1 | * | 8/2005 | Costea et al. | 726/22 |

OTHER PUBLICATIONS

Brown, N., "RCOM:Remote Commands Without Tears", *Digital Systems Journal*, Jul./Aug. 1994, 16(4), 9-10.
Flynt, C., "Coding Techniques for Reducing Code Maintenance", *Proceedings of the 5th TCL/Tk Workshop*, Jul. 14-17, 1997, 183-184.
Mitchell, S., "Easier Console Apps in Win 32", *C/C ++ Users Journal*, 1999, 17(9), 63,65-69.
Mione, A.H., "Filling in Resources from Command Line Options in X", *Computer Economics*, 1996, 18(5), 10-15.
Skjellum, A. "Argum-A "C" Command Line Processor", *Dr. Dobbs Journal*, 1982, 7(8), 10-31.

* cited by examiner

*Primary Examiner*—Tuan Q Dam
*Assistant Examiner*—Isaac T Tecklu
(74) *Attorney, Agent, or Firm*—Woodcock Washburn LLP

(57) ABSTRACT

An extensible generic command line parser may receive a list of options associated with an application and a command line to parse. A new command line option may be added to the options that can be parsed by adding the new command line option to the list of options. By receiving a modifiable list of valid options from an application, the parser is extensible, that is, instead of having to modify or recode the parser when a new option is added to the application, the new option may be added to the option file. When the parser receives the option list with the new option or options, any option in the file (including any new ones) may be automatically parsable by the parser.

38 Claims, 4 Drawing Sheets

EXTENSIBLE COMMAND LINE PARSING

FIELD OF THE INVENTION

The invention relates to command line parsers and in particular to providing extensibility in command line parsing.

BACKGROUND OF THE INVENTION

Before the advent of the graphical user interface (GUI), in which a command is typically issued by moving a pointer (e.g., a mouse cursor) and/or pressing a key (i.e., "clicking", often on a key mounted on a mouse), the predominant way a user interacted with a computer was by entering a command on a command line. Although seemingly more "primitive", this means of communication is more direct, and is often more powerful and more flexible than the directed pathways defined by a GUI. Most new applications that are written are still written to be accessible directly by entering a textual command at a command prompt.

The command line entered at a command line prompt (e.g., "C:\>") is frequently complex. Sometimes the command line is of the form:

```
<DoSomething> <how> <ToASomething>
or
<DoSomething> <how> <ToAnInputFile> > <CreatingAnOutputFile>
``` where DoSomething corresponds to an action, how describes how the action should be executed, for instance, and ToASomething corresponds to the object acted upon (often one or more files). The fourth ">" in the second example is a redirection character, telling the operating system to send the output of the previous commands (i.e., those to the left of the fourth ">") to some other place (i.e., that place indicated by the characters to the right of the fourth ">", in this case, to the OutputFile).

Because of the complexity of command lines, the command line is often validated or parsed by the application to determine if it has been entered correctly before the application attempts to execute the command. Parsing usually is done by breaking down text into recognized strings of characters and analyzing the grammatical structure of the strings, with respect to a given formal grammar.

Frequently, however, applications and therefore the commands that execute the applications change. This usually requires the parsing code to change, a nontrivial programming exercise. It would be helpful if there were a way to make a generic parser that could be used by many different applications over their lifetimes, without requiring recoding of the parser.

SUMMARY OF THE INVENTION

An extensible generic command line parser may receive a list of options associated with an application and a command line to parse. A new command line option may be added to the options that can be parsed by adding the new command line option to the list of options. By receiving a modifiable list of valid options associated with an application, the parser is extensible, that is, instead of having to modify or recode the parser when a new option is added to the application, the new option may be added to the option file. When the parser receives the option list with the new option or options, any option in the file (including any new ones) may be automatically parsable by the parser.

The extensible generic parser may read and parse out an option from the command line. The extensible generic command line parser may determine whether the command line includes a valid option by comparing the command line option with the list of options. If a match occurs, the parser may determine that the option is valid.

The parser may receive an option list that includes for each option, a minimum number of characters that uniquely identifies the option. When the parser reads and parses out an option from the command line, it may determine if the number of characters in the input received for the option are enough to uniquely identify the option, and if so, may recognize the option by the minimum number of characters specified for the option. If the minimum number of characters has been received for the option, an exact match may be required for a valid option result to be returned by the parser. If more than the minimum number of characters are received, then all the characters specified may be required to match for a valid option result to be returned by the parser.

The parser may also determine if an argument is required for the option. If the option requires an argument, the parser may determine if the required argument is present or missing. The parser may return a failure or success result and may receive and respond to queries concerning the parsed command line.

The extensible generic parser may be used in almost any application that needs to parse a command line. It may simplify development and reduce development time because the same parser may be used by many different applications merely by sending the parser a different list of options.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

A command line application may have a number of different options that modify the behavior of the application when it is executed. Each option may take one or more arguments that provide information that the command line application needs to execute. A command line is often quite long and complex and therefore is often validated or parsed before it is executed. Typically this processing is performed within the application itself. It is the nature of an application to change. Options once used are no longer used, new options are added and so on. Typically whenever an option in an application changes, so too must change the validation and parsing. Unfortunately, coding or modifying a parser is a non-trivial programming exercise.

In accordance with the invention, the parsing function is separate from the processing of the application. Hence the parser can be used by many different applications to parse their command lines. Upon receiving a list of allowable options and a command line, the parser parses the command line and returns a result. The parser may receive and respond to queries concerning the command line.

Exemplary Computing Environment

Figure 1:
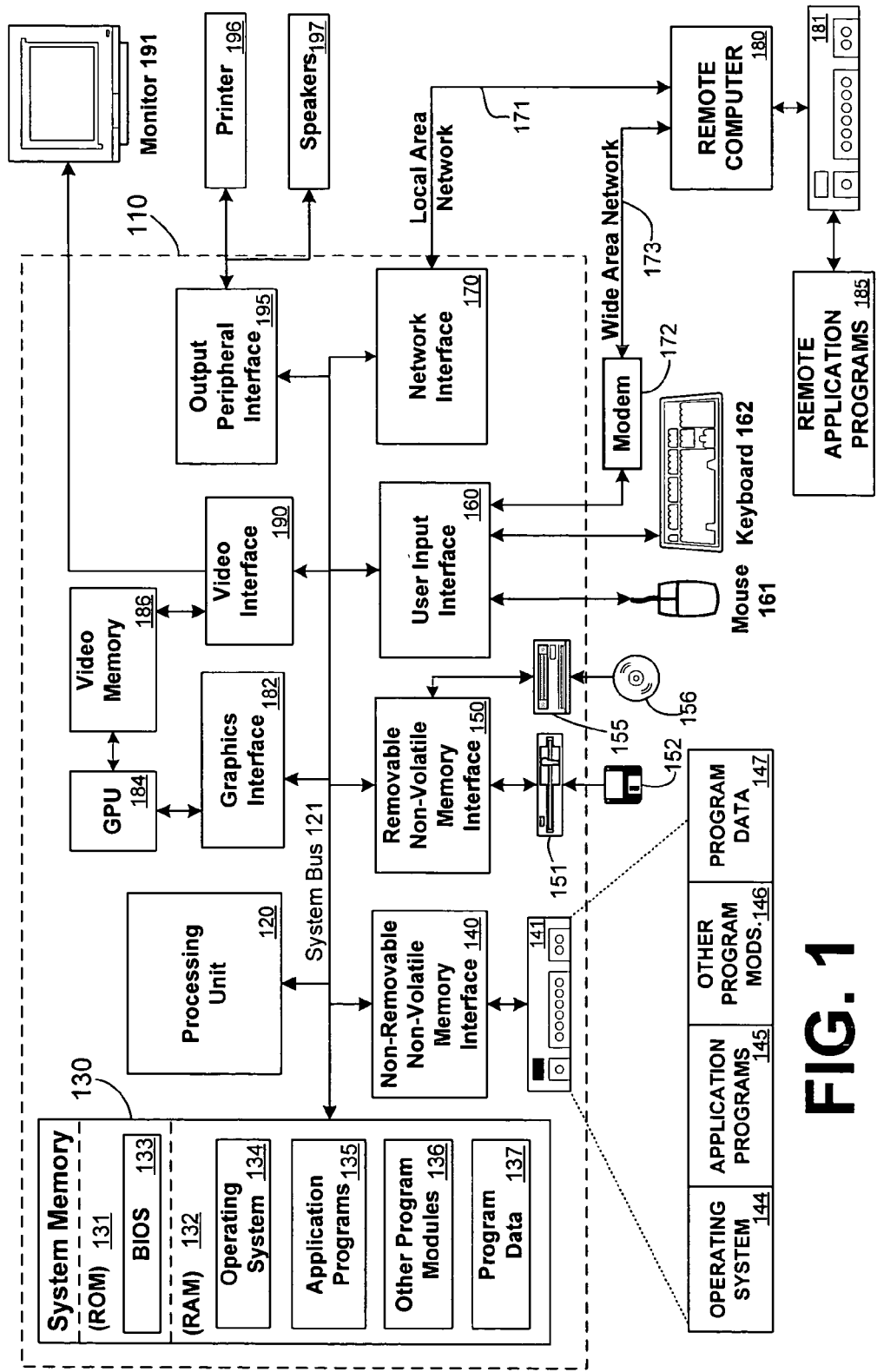
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1a illustrates operating system 134, application programs 135, other program modules 136, and program data 137.

The computer 110 may also include other removable/non-removable, volatile/nonvolatile computer storage media. By way of example only, FIG. 1a illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1a. The logical connections depicted in FIG. 1a include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1a illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Extensible Command Line Parsing

Figure 2:
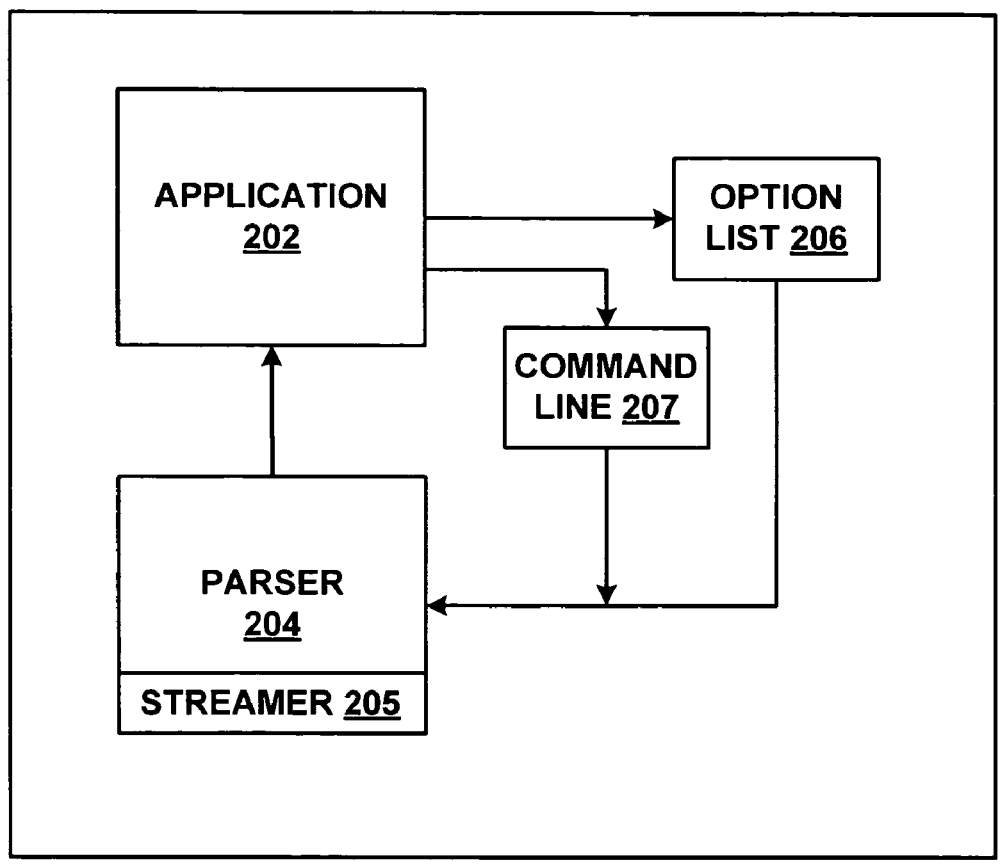
FIG. 2 is a block diagram of an exemplary system for extensible parsing of command lines in accordance with one embodiment of the invention.

FIG. 2 is a block diagram of an exemplary system 200 for extensible parsing of command lines in accordance with one embodiment of the invention. System 200 may include an extensible parser 204. System 200 may also include an application 202. Extensible parser 204 may receive a list of options 206 and/or a command line 207 from application 202 and may return results to application 202.

Extensible parser 204 may include a streamer 205 that receives a string of characters and abstracts characteristics of the input (e.g., a command line) received, delivering a single character at a time to the extensible parser 204. For example, streamer 205 may handle reading the command line input from a file, understanding the format of the command line and so on.

Application 202 in some embodiments of the invention, in response to receiving a command line input, instantiates extensible parser 204 and sends extensible parser 204 a list of valid options 206. In some embodiments of the invention, the list of options 206 includes one or more of the following data elements for each allowable option:

a command line option string the minimum number of characters that uniquely identifies the command line option a command line option identifier (a pneumonic or variable name that represents, for example, a unique number that the application understands to refer to the command line option, (e.g., OPTION_ID=1 for command line option "file"), or global unique identifier (GUID)). Alternatively, the command line option identifier may represent an entire command line option and argument.

a parameter providing additional information about the type of allowable arguments for the option, such as for example, the number of arguments required for the option.

In some embodiments of the invention, a value of "0" for the parameter may indicate that no argument is allowed, a value of "0 or 1" may indicate that an argument is allowed but not required and a value of "1" may indicate that an argument is required. It will be understood, that the invention is not limited to this scheme, any suitable scheme may be devised.

In some embodiments of the invention, option list 206 may be an external file or other data structure that can be modified by a word processing program or a text editor. Hence option list 206 may be easily modified without requiring any programming expertise or any change to application 202 code.

In some embodiments of the invention, application 202 may send extensible parser 204 a command line 207. An exemplary command line may include one or more sets of the following data elements, delimited by a separator such as but not limited to a slash (/):

an option of the application to execute and/or an argument for the option of the application to execute.

An exemplary command line may be:

/file c:\temp\mypkg.dtsx

In the above command line, the "/" (slash) may indicate that a new option is starting, the option name is "file" and the argument for option "file" is "c:\temp\mypkg.dtsx". The appearance of a second slash as in the following command line:

/file c:\temp\mypkg.dtsx/[option2]

may signal the beginning of a second option, here indicated by "[option2]".

The extensible parser 204 may receive the list of allowable options and the command line. In some embodiments of the invention, the extensible parser 204 may read and parse out an option from the command line. The extensible parser 204 may then compare the parsed out option with the option list to determine if there is a match. The string specified for the option ("file" in the above example) may be used to find the matching string in the option list. If there is no match, a failure result may be returned to the application.

In some embodiments of the invention, if the command line or an option on the command line received is a string of blanks, (i.e., the option is blank), an error message is returned. Alternatively, a message indicating that no options have been received may be returned.

In some embodiments of the invention, if the minimum number of characters that uniquely identifies the command line option has not been specified for the option, the entire name of the option is specified on the command line and is matched against the entire name of the option in the option list. If there is no match, a failure result may be returned to the application. If there is a match, processing may continue.

In some embodiments of the invention, if the minimum number of characters that uniquely identifies the command line option has been specified for the option in the option list and the number of characters specified on the command line is less than the minimum for the option, a failure result is returned. If the minimum number of characters that uniquely identifies the command line option has been specified for the option in the option list and the number of characters specified on the command line is at least equal to the minimum for the option, the characters specified may be matched against the option name. If there is no match, a failure result may be returned to the application. If there is a match, processing may continue.

In order for a success result to be returned by the parser, there must be an exact match of at least the minimum number of unique characters. Furthermore, if more than the minimum number of characters is specified then all the characters specified may be required to match exactly. For example, in some embodiments of the invention, given the options: MyFirstOpt, and MySecondOpt, three characters are needed to uniquely identify between the options. Therefore, in this case, the option list provided to the parser may be: MyFirstOpt, 3, MySecondOpt, 3 (option name, number of minimum characters required to disambiguate, option name, number of minimum characters required to disambiguate). This option list input indicates that the parser is able to validate the options with a minimum of three characters, however, more than three characters (up to the number of characters in the option) may optionally be specified.

Suppose the command line specified "My". In this case, the parser may return an invalid result (i.e., failure) because not enough characters were specified (2 instead of 3) to disambiguate between MyFirstOpt and MySecondOpt. Suppose the command line specified "MyF", in this case, the parser may return a valid result (i.e., success) because the minimum number of characters (i.e., three characters) have been received and the three characters received match exactly the first three characters of "MyFirstOpt". Suppose the command line specified "MySec". The parser may return a valid result because at least three characters were received and all five characters received match exactly the first five characters of "MySecondOpt". Suppose the command line specified "MySection". An invalid result may be returned because the sixth letter (i.e., "t") does not match the sixth letter of "MySecondOpt". Suppose the command line specified "MyFirstOpt", a valid result may be returned because the entire option matches an option in the list. Suppose "MyFirst Option" were received. An invalid result may be returned because too many characters were received to match the entire "MyFirstOpt" option name, and so on. In some embodiments of the invention, the matching logic is case sensitive. In some embodiments, the matching logic is case insensitive.

If an argument for the option number is received, the argument may be compared with the parameter providing additional information about the type of allowable arguments for the option.

If the argument is not allowable, a failure result may be returned. If the argument is allowable, this set of command line input data elements is correct and the next set of command line input data elements may be parsed. This processing continues until an error is detected or until the entire command line is parsed. If the entire command line is parsed and no errors are found, the extensible parser 204 may return a success result. Alternatively, the extensible parser 204 may return a list of valid options and the arguments for the options, a list of errors, or any other suitable information.

Application 202, upon receiving the success result from the extensible parser 204, may request the parser 204 to send the application 202 all the options entered on the command line. Alternatively, the application 202 may request the parser 204 for a specific command line option and its arguments or for particular information concerning one of the options and/or its argument(s). Application 202 may request information about a specific command line option by specifying the string (e.g., "file") or by specifying the command line identifier (e.g., "1"). Similarly parser 204 may return requested information about a specific command line option by specifying the string (e.g., "file") or the command line identifier (e.g., "1").

In some embodiments of the invention, intelligence concerning dependencies between options may be included within the parser. For example, suppose three options for a command line are "file", "dts" and "SQL". Suppose any one of the three does not necessarily have to be specified but one and only one of the three must be specified. Parser 204 may include the logic required to determine whether the above conditions were met in a command line.

In some embodiments of the invention, the application is a command line utility that transforms data. A package may be created (e.g., in a designer), specifying the input source, the data transformations to be performed and the output destination. In some embodiments of the invention, the command line data transformation utility may include a number of command line options (e.g., an option to specify the source, the name of the package to execute, and so on).

Figure 3:
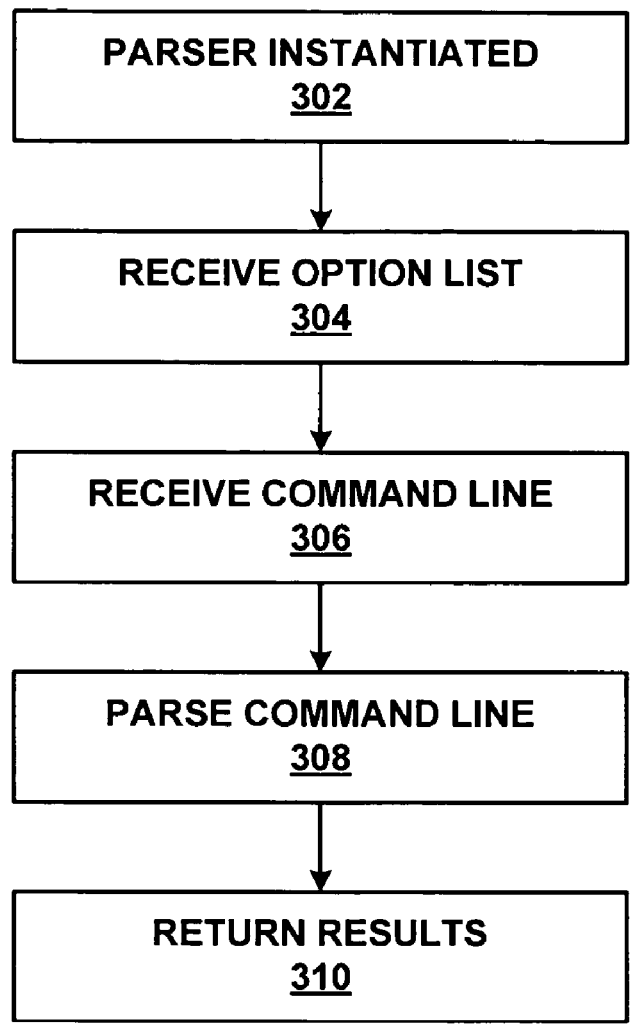
FIG. 3 is a flow diagram of an exemplary method for extensible parsing of command lines in accordance with one embodiment of the invention.

FIG. 3 is a flow diagram of an exemplary method for extending the functionality of a parser. One or more of the steps may be optional. A given option list, as described above, may be created or modified. An application may be initiated. The application may receive a command line. At step 302 the application may then instantiate an extensible parser in accordance with the invention.

At step 304 the parser may receive a list of options. The list of options may be sent to the parser by the application. Alternatively, the parser may access a specified location for the list of options. The list of options may include entries for one or more options. Each option may include one or more of the following data elements:

a command line option the minimum number of characters that uniquely identifies the command line option an identifier (a sequence of characters that represents a unique number that the application understands to refer to the command line option)

a parameter providing additional information about the type of allowable arguments for the option.

At step 306 the parser may receive the command line (e.g., from the application). Alternatively, the list of allowable options and the command line may be received in one step.

At step 308 the parser may parse the command line received and at step 310 may return the result (e.g., to the application). In some embodiments of the invention, the result the parser returns may be success or failure. In some embodiments the parser may return the entire command line. In some embodiments the parser may return a single command line option and its arguments one at a time. In some embodiments the parser may return its results in response to a query received (e.g., from the application).

Figure 4:
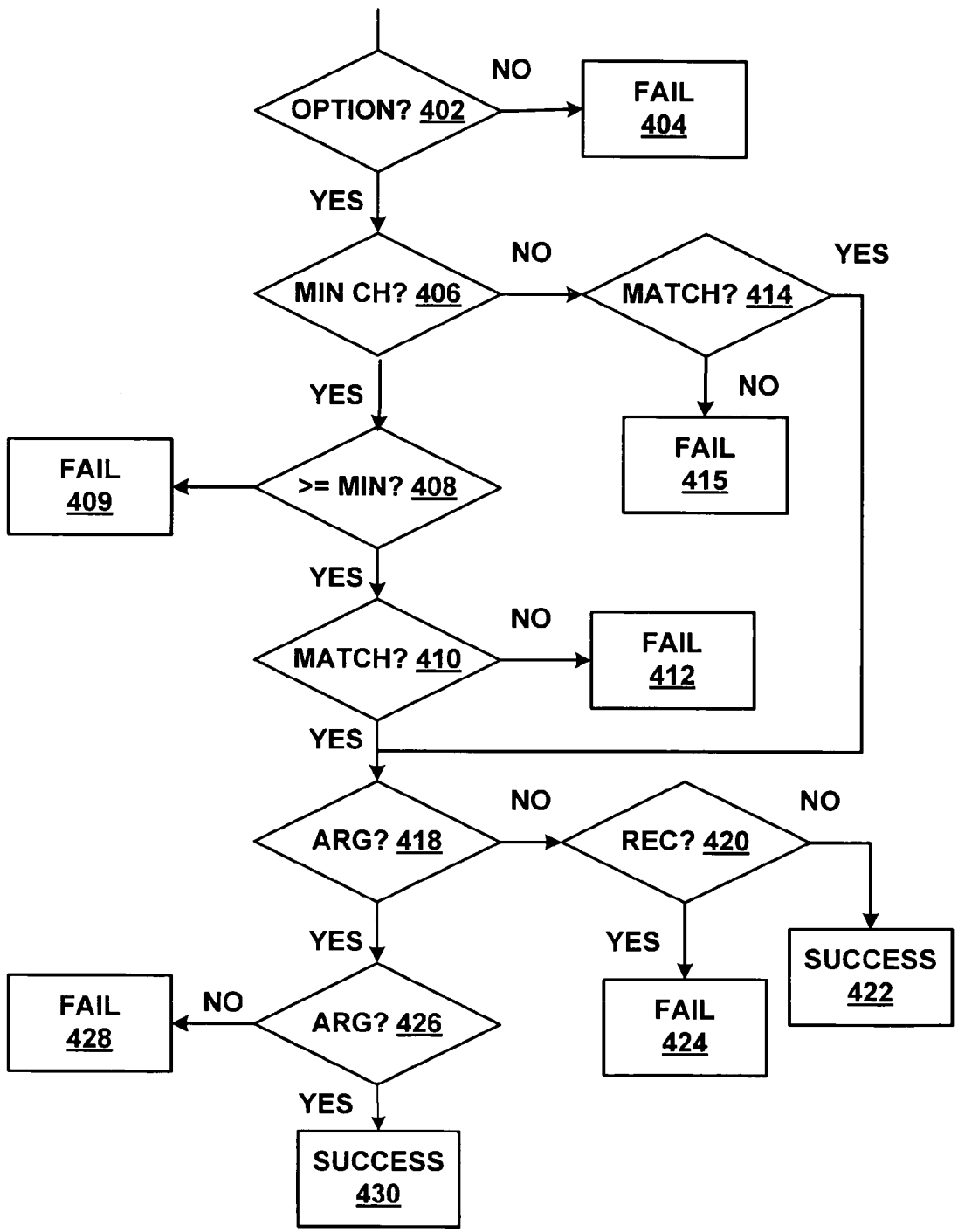
FIG. 4 is a more detailed flow diagram of several steps of the exemplary method for extensible parsing of command lines of FIG. 3.

FIG. 4 is a more detailed flow diagram of the parsing and response steps, steps 308 and 310 of FIG. 3, in accordance with some embodiments of the invention. One or more of the steps may be optional.

In FIG. 4, at step 402, the extensible parser may determine if an option has been received on the command line. If no option has been received, a failure result may be returned at 404. In some embodiments of the invention, if the command line or an option on the command line received is a string of blanks, (i.e., the option is blank), an error message is returned. Alternatively, a message indicating that no options have been received may be returned. If an option was received, at 406, the parser may check to see if a minimum number of characters to uniquely identify the option has been received in the option list for that option. If a minimum number of characters to uniquely identify the option has not been received in the option list for that option, processing continues at step 414. At step 414, all the characters received on the command line may be matched against the complete names of the options in the option list. If a match is not found a failure result may be returned at step 415. If a match is found, processing may continue at step 418.

If a minimum number of characters to uniquely identify the option has been received in the option list for that option, at step 408, the parser may determine whether the number of characters received for the option on the command line is equal to or greater than the minimum number of characters required to uniquely identify the option. If the minimum required number of characters has not been received for the option on the command line, the parser may return a failure result at step 409. If the minimum required number of characters has been received, all the characters specified for the option on the command line may be matched against the same number of characters of the option in the option list at step 410. If there is a match processing may continue at step 418. If there is no match, a failure result may be returned at step 412.

At step 418, the parser may determine if an argument for the option is required by consulting the parameter data element of the option file record. If an argument is not permitted and none has been received, a success result may be returned at step 422. If an argument is not permitted but an argument is received, a failure result may be returned at step 424.

At step 418, if the parser determines that an argument is required for the option, processing may continue at step 426. At step 426, if no argument exists on the command line, a failure result may be returned at step 428. If an argument is required and an argument is received for that option a success result may be returned at step 430. If an argument is required or allowed, the argument may be further parsed according to rules associated with that argument. If an error is found, a failure result may be returned to application. If an error is not found, a success result may be returned for this option.

If an argument for the option number is received, in some embodiments, the argument is compared with the parameter providing additional information about the type of allowable arguments for the option.

If the argument is not allowable, a failure result may be returned. If the argument is allowable, this set of command line input data elements is correct and the next set of command line input data elements may be parsed. In some embodiments, this processing continues until an error is detected or until the entire command line is parsed. If the entire command line is parsed and no errors are found, the extensible parser 204 may return a success result.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A system comprising, the system comprising:

a processor;

an extensible generic parser, implemented on the processor, that returns a result to an application in accordance with receiving a list of allowable options for the application and a command line for the application, the command line comprising a first command line option, wherein the list of allowable options comprises, for each allowable option, a command line option string, a minimum number of characters that uniquely identify the command line option, a command line option identifier, and a parameter having a value indicative of a type of allowable arguments for the command line option string, wherein a success result is returned when it is determined that the first command line option in the command line exactly matches a portion of an option name in the list, a number of characters in the first command line option in the command line being not less than a minimum number of characters of the portion of the option name in the list of allowable options.

2. The system of claim 1, wherein a success result is returned to the application in response to determining that the first command line option is included in the list of allowable options for the application.

3. The system of claim 2, wherein determining that the first command line option is included in the list of allowable options for the application comprises successfully matching the first command line option with an option in the list of allowable options.

4. The system of claim 1, wherein a failure result is returned to the application in response to determining that the first command line option is not included in the list of allowable options for the application.

5. The system of claim 4, wherein determining that the first command line option is not included in the list of allowable options for the application comprises unsuccessfully matching the first command line option with a first allowable option in the list of allowable options.

6. The system of claim 1, wherein the extensible generic parser returns a success result to the application in response to determining that the first command line option requires an argument and the argument is present in the command line.

7. The system of claim 1, wherein the extensible generic parser determines that the first command line option requires an argument by comparing a parameter in a first allowable option in the list of allowable options for the first command line option with a predetermined value.

8. The system of claim 1, wherein the extensible generic parser returns a failure result to the application in response to determining that the first command line option requires an argument and the argument is missing on the command line.

9. The system of claim 1, wherein the extensible generic parser determines that the first command line option prohibits an argument by comparing a parameter in a first allowable option in the list of allowable options for the first command line option with a predetermined value.

10. The system of claim 1, wherein a first allowable option in the list of allowable options comprises a minimum number of characters required to uniquely identify the first command line option.

11. The system of claim 10, wherein a success result is returned in response to determining that the first command line option exactly matches the minimum number of characters of a first allowable option name in the list of allowable options.

12. The system of claim 1, wherein a success result is returned in response to determining that an identifier in the command line matches an identifier in the list of allowable options.

13. The system of claim 1, wherein the first command line option is blank.

14. The system of claim 13, wherein an error message is returned.

15. The system of claim 13, wherein a message indicating no options were received is returned.

16. The system of claim 1, wherein the result is returned in response to receiving a query from the application.

17. A method for extensible parsing a command line of an application comprising:

receiving an option list of allowable options of the application, the option list comprising a first allowable option, wherein the list of allowable options comprises, for each allowable option, a command line option string, a minimum number of characters that uniquely identify the command line option, a command line option identifier and a parameter having a value indicative of a type of allowable arguments for the command line option string;

receiving the command line of the application, the command line of the application comprising a first command line option; and parsing the command line to determine if the first command line option matches the first allowable option of the option list, wherein a success result is returned when it is determined that the first command line option in the command line exactly matches a portion of an option name in the list, a number of characters in the first command line option in the command line being not less than a minimum number of characters of the portion of the option name in the list of allowable options.

18. The method of claim 17, wherein parsing the command line comprises:

comparing a number of characters of the first command line option on the received command line with a minimum number of characters required to uniquely identify the first allowable option in the option list.

19. The method of claim 18, further comprising returning a failure result in response to determining that the minimum number of characters required to uniquely identify the first allowable option in the option list is greater than the number of characters of the first command line option on the command line.

20. The method of claim 17, wherein parsing the command line comprises:

determining if the first command line option received from the command line is associated with an argument;

determining if the first allowable option of the option list indicates that the argument for the first command line option is required.

21. The method of claim 20 further comprising:

in response to determining that the first command line option is associated with the argument and the first allowable option of the option list indicates that the argument for the first command line option is required, returning a success result.

22. The method of claim 20, further comprising:
in response to determining that the first command line option is associated with the argument and the first allowable option of the option list indicates that the argument is prohibited, returning a failure result.

23. The method of claim 17, further comprising:
in response to determining that the first command line option is not associated with an argument and the option list indicates that the argument for the first command line option is required, returning a failure result.

24. The method of claim 17, wherein the first command line option is blank.

25. The method of claim 24, wherein an error message is returned.

26. The method of claim 25, wherein a message indicating that no options were received is returned.

27. The method of claim 17, wherein the result is returned in response to a query.

28. A computer readable storage medium comprising computer-executable instructions for:
receiving an option list of allowable options for an application, the option list comprising a first option, wherein the list of allowable options comprises, for each allowable option, a command line option string, a minimum number of characters that uniquely identify the command line option, a command line option identifier and a parameter having a value indicative of a type of allowable arguments for the command line option string;
receiving a command line for the application, the received command line comprising a second option;
parsing the received command line to determine if the second option matches the first option of the option list, wherein a success result is returned when it is determined that the first command line option in the command line exactly matches a portion of an option name in the list, a number of characters in the first command line option in the command line being not less than a minimum number of characters of the portion of the option name in the list of allowable options.

29. The computer readable storage medium of claim 28, comprising further computer-executable instructions for: comparing a number of characters of the second option on the command line with a minimum number of characters required to uniquely identify the first option of the option list.

30. The computer readable storage medium of claim 28, comprising further computer-executable instructions for:
returning a failure result in response to determining that a minimum number of characters required to uniquely identify the first option is greater than a plurality of characters comprising a second option name.

31. The computer readable storage medium of claim 28, comprising further computer-executable instructions for:
returning a success result in response to determining that a plurality of characters comprising a second option name is at least equal to a minimum number of characters required to uniquely identify the first option and that the plurality of characters of the second option name exactly matches corresponding characters of the first option.

32. The computer readable storage medium of claim 28, comprising further computer-executable instructions for:
determining if the second option is associated with an argument; and
determining if the first option indicates that the argument for the second option is required.

33. The computer readable storage medium of claim 28, comprising further computer-executable instructions for:
in response to determining that the second option is associated with an argument and the first option indicates that the argument for the second option is required, returning a success result.

34. The computer readable storage medium of claim 28, comprising further computer-executable instructions for:
in response to determining that the second option is associated with an argument and the first option indicates that the argument for the second option is prohibited, returning a failure result.

35. The computer readable storage medium of claim 28, comprising further computer-executable instructions for:
in response to determining that the second option is not associated with an argument and the first option list indicates that the argument for the second option is required, returning a failure result.

36. The computer-readable storage medium of claim 28, comprising further computer-executable instructions for:
determining that the second option is blank.

37. The computer-readable storage medium of claim 36, comprising further computer-executable instructions for:
returning an error message.

38. The computer-readable storage medium of claim 28, comprising further computer-executable instructions for:
returning a result in response to receiving a query.

* * * * *